United States Patent [19]

Koga et al.

[11] Patent Number: 5,424,777
[45] Date of Patent: Jun. 13, 1995

[54] TIME-VARYING IMAGE SIGNAL CODING/DECODING SYSTEM

[75] Inventors: Toshio Koga; Masayuki Okajima, both of Tokyo, Japan

[73] Assignee: NEC Corporation, Tokyo, Japan

[21] Appl. No.: 294,795

[22] Filed: Aug. 25, 1994

Related U.S. Application Data

[62] Division of Ser. No. 936,310, Aug. 28, 1992, Pat. No. 5,369,437.

Foreign Application Priority Data

Aug. 28, 1992 [JP] Japan .................................. 3-215692
Aug. 28, 1992 [JP] Japan .................................. 3-215693

[51] Int. Cl.$^6$ ..................... H04N 7/133; H04N 7/137
[52] U.S. Cl. ..................................... 348/402; 348/400; 348/401; 348/403; 348/416
[58] Field of Search ............... 348/401, 402, 403, 400, 348/409, 416, 417, 384, 390; H04N 7/133, 7/137

References Cited

U.S. PATENT DOCUMENTS

| | | | |
|---|---|---|---|
| 4,833,535 | 5/1989 | Ozeki | 348/400 |
| 5,089,888 | 2/1992 | Zdepski | 348/405 |
| 5,121,202 | 6/1992 | Tanoi | 348/409 |
| 5,237,410 | 8/1993 | Inoue | 348/409 |

OTHER PUBLICATIONS

S. Okubo et al., "International Standardization of Video Codecs for ISDN Videoconferencing and Videophone Services", NTT Review, vol. 2, No. 3, May 1990, pp. 110–117.

Primary Examiner—Tommy P. Chin
Assistant Examiner—Vu Le
Attorney, Agent, or Firm—Sughrue, Mion, Zinn, Macpeak & Seas

[57] ABSTRACT

A time-varying image signal coding apparatus including a local encoded signal being quantized by a quantizing circuit, and the quantized signal is selected when refreshing is to be accomplished, and subjected to code transform by a code transform circuit to be transmitted to a time-varying image signal decoding apparatus. The signal supplied from the quantizing circuit is a transform coefficient in the transform region, and this is divided into a plurality of groups to be refreshed on a group-by-group basis. The transfer control on a group-by-group basis when refreshing is to take place is accomplished with a control signal supplied from a switching control circuit, and this control signal also undergoes code transform by the code transform circuit to be transmitted to the time-varying image signal decoding apparatus. In the time-varying image signal decoding apparatus, in accordance with the switching control signal transmitted from the time-varying image signal coding apparatus, refreshing is achieved by such selection that the transform coefficient to be refreshed is directly written into a frame memory from a code inverse transform circuit. When a time-varying image signal is to be transferred by using interframe transform and transform coding, grouping is achieved by the units of transform coefficient, and frames are rewritten with each group independent of others.

12 Claims, 6 Drawing Sheets

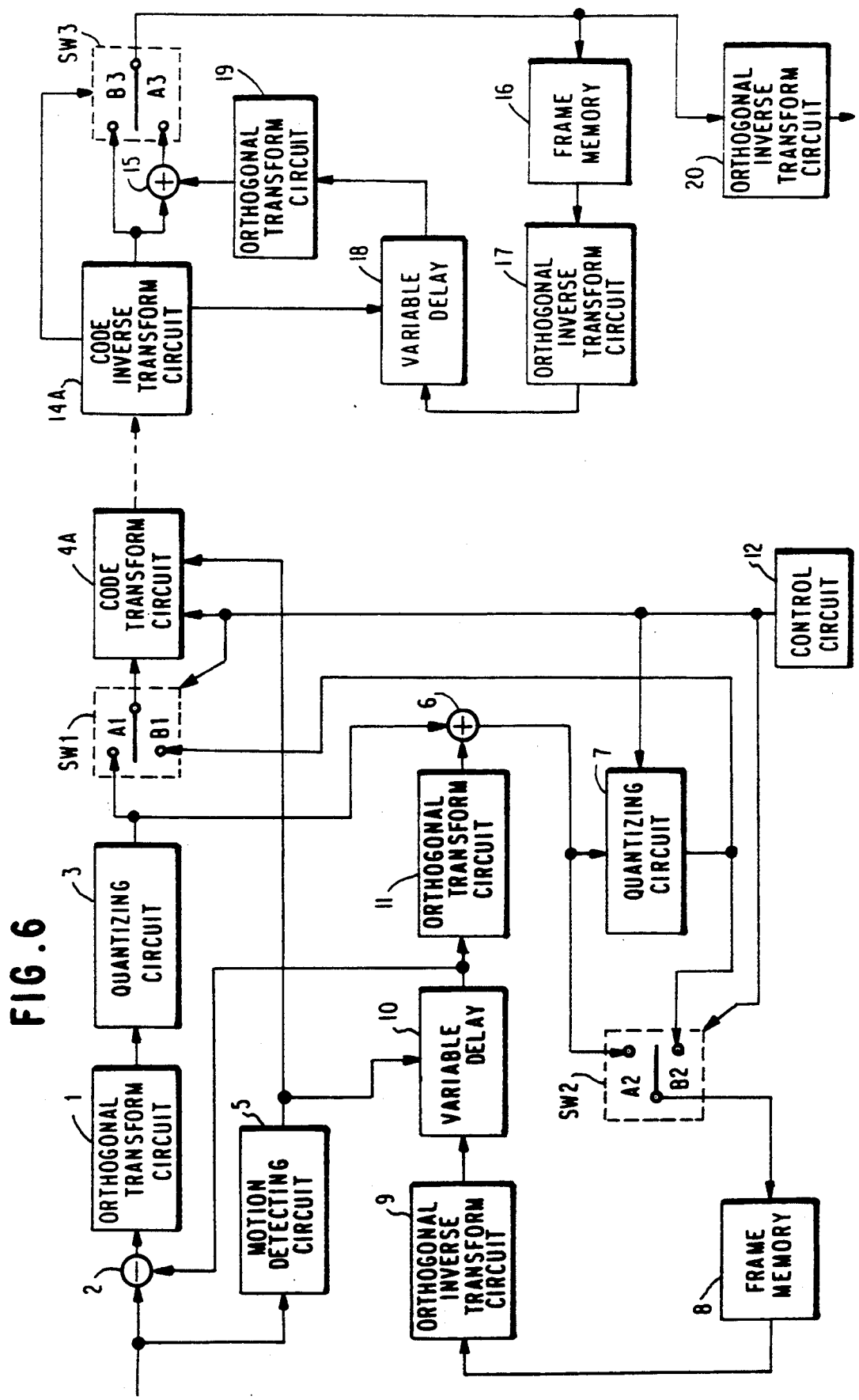

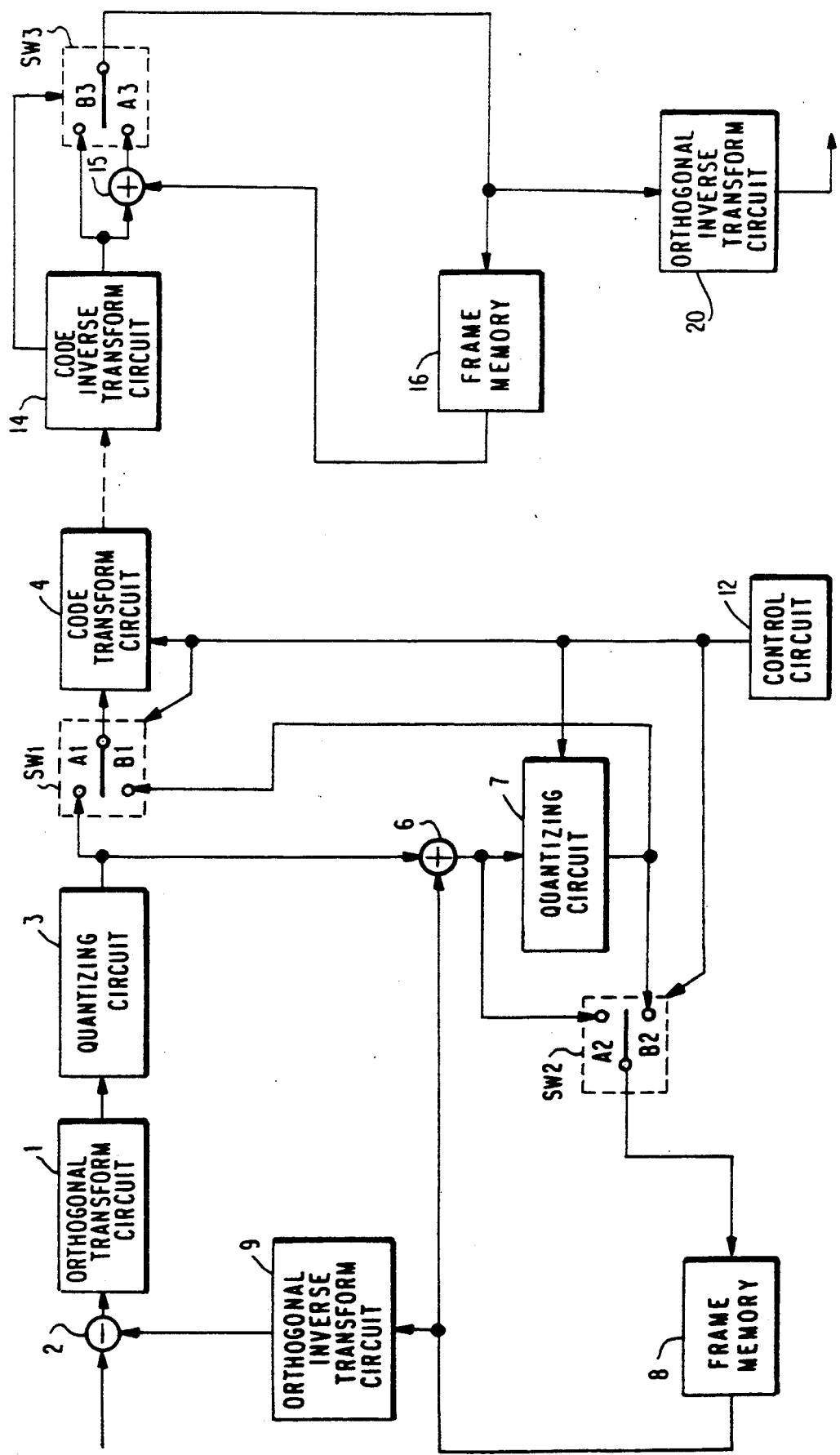

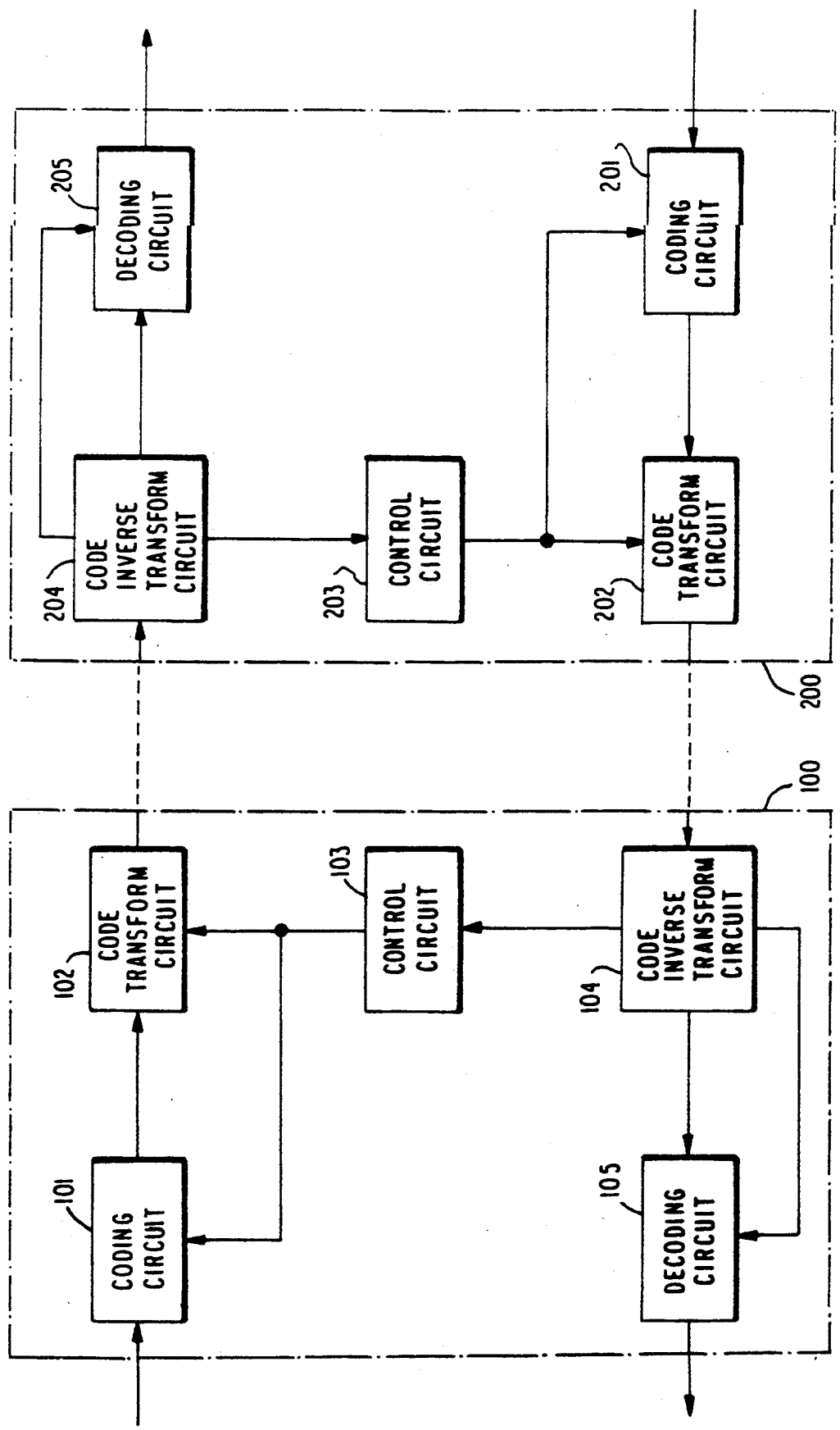

TIME-VARYING IMAGE SIGNAL CODING/DECODING SYSTEM

This is a divisional of application Ser. No. 07/936,310, filed Aug. 28, 1992, now U.S. Pat. No. 5,369,437.

BACKGROUND OF THE INVENTION

1. Field of the Invention

The present invention relates to a time-varying image signal coding/decoding system, and more particularly to a time-varying image signal (moving picture signal or video signal) coding/decoding system using an interframe differential orthogonal transform coding method combining the prediction of interframe differentials and orthogonal transform.

2. Description of the Prior Art

In a time-varying image signal coding/decoding system of this kind according to the prior art, the frame memory in the time-varying image signal decoding unit is periodically refreshed in order to prevent any error on the transmission path from deteriorating the picture quality on the receiving side. Where an interframe differential orthogonal transform coding method or a orthogonal transform interframe coding method is used, since the content of the frame memory is a transform coefficient after orthogonal transform, time-varying image signals entered into the time-varying image signal coding unit are subjected to orthogonal transform, and quantized signals are transmitted at a rate of, for instance, one block line per frame as refreshing signals to refresh a whole frame in the frame memory in the time-varying image decoding unit at fixed intervals. Incidentally, where coding takes place in units of a two-dimensional block of I lines by J pixels each, for example, I lines of signals are collectively referred to as one block line.

In the conventional time-varying image signal coding/decoding system mentioned above, all the transform coefficient components of the signals resulting from the orthogonal transform coding of time-varying image signals entered into the time-varying image signal coding unit are collectively used as refreshing signals. However, picture quality deterioration on the receiving side due to any error on the transmission path usually results from a partial error in the transform coefficient. The time-varying image signal coding/decoding system according to the prior art, which collectively refreshes even the components needing no refreshing, involves the problem of wastefulness. Furthermore the conventional time-varying image signal coding/decoding system often accomplishes refreshing in units of block lines, and in that case there is the additional problem of restricting the efficiency of coding because information for the refreshing purposes accounts for a high proportion in each frame.

The above-mentioned time-varying image signal coding/decoding system according to the prior art is described in detail in a paper entitled "International Standardization of Video Codes for ISDN Videoconferencing and Videophone Services" in NTT Review, Vol. 2, No. 3, May 1990 (p.p. 110–117).

BRIEF SUMMARY OF THE INVENTION

Object of the Invention

An object of the present invention is to solve the aforementioned problems and provide a time-varying image signal coding/decoding system capable of improving the coding efficiency while maintaining the effect of refreshing.

Summary of the Invention

In a first time-varying image signal coding apparatus according to the invention, orthogonal transform means orthogonally transforms an inputted time-varying image signal on a block-by-block basis, each block consisting of a plurality of pixesl. Subtracting means subtracts a first predicted signal from said orthogonally transformed signal to supply a prediction error signal. First quantizing means quantizes said prediction error signal to supply a first quantized signal. Adding means adds said first quantized signal and said first predicted signal to supply a local decoded signal. Second quantizing means quantizes said local decoded signal to supply a second quantized signal. First switching means selectively connects either said local decoded signal or said second quantized signal. A first frame memory delays the signal selectively connected by said first switching means by a predetermined number of frames, to supply the delayed signal as said first predicted signal. Second switching means selectively connects either said first or second quantized signal. Switching control means provides a switching control signal which gives an instruction to said first and second switching means to selectively connect said second quantized signal when a second frame memory built into a time-varying image signal decoding apparatus is to be refreshed, or to said first switching means and said second switching means to selectively connect said local decoded signal and said first quantized signal, respectively, if said second frame memory is not to be refreshed. Code transform means subjects said first and second quantized signals, selected by said second switching means, and said switching control signal, and transmits the transformed signals.

In a first time-varying image signal decoding apparatus according to the invention, code inverse transform means separates and reproduces said first or second quantized signal and said switching control signal by subjecting a sequence of codes, transmitted from the time-varying image signal coding apparatus, to code inverse transform. Adding means adds a second precicted signal to said first quantized signal reproduced by said code inverse transform means. Third switching means selectively connects said second quantized signal if the switching control signal reproduced by said code inverse transform means gives an instruction to refresh, or the addition signal of said adding means if the instruction is not to refresh. The second frame memory delays the signal selectively connected by said third switching means by a predetermined number of frames to supply the delayed signal as said second predicted signal. Orthogonal inverse transform means reproduces said time-varying image signal by subjecting the signal selectively connected by said third switching means to inverse transformation and to orthogonal transformation.

In a second time-varying image signal coding apparatus according to the invention, subtracting means subtracts a first predicted signal from an inputted time-varying image signal to supply a prediction error signal. A motion detecting circuit detects a moving vector signal by subjecting said time-varying image signal to interframe block matching. First orthogonal transform means orthogonally transforms said prediction error signal on a block-by-block basis, each block consisting of a plurality of pixels. First quantizing means quantizes the result of said orthogonal transform to supply a first quantized signal. First adding means adds said first quantized signal and orthogonally transformed signal to supply a local decoded signal. Second quantizing means quantizes said local decoded signal to supply a second quantized signal. First switching means selectively connects either said local decoded signal or said second quantized signal. A first frame memory delays the signal selectively connected by said first switching means by a predetermined number of frames to supply the delayed signal as a second predicted signal. A second orthogonal inverse transform circuit returns said second predicted signal from the transform region to the space region. A variable delay circuit gives a delay corresponding to said moving vector signal to the signal returned to the space region by said first orthogonal inverse transform circuit to generate said first predicted signal. A first orthogonal transform circuit generates said orthogonally transformed signal by subjecting said first predicted signal to orthogonal transform. Second switching means selectively connects either said first or second quantized signal. Switching control means provides a switching control signal which gives an instruction to said first and second switching means to selectively connect said second quantized signal when a second frame memory built into a time-varying image signal decoding apparatus is to be refreshed, or to said first switching means and said second switching means to selectively connect said local decoded signal and the quantized signal from said first quantizing means, respectively, if said second frame memory is not to be refreshed. Code transform means subjects the quantized signal selectively connected by said second switching means to variable length coding, encodes said moving vector signal and said switching control signal, and transmits the coded signals.

In a second time-varying image signal decoding apparatus according to the invention, code inverse transform means separates and reproduces said quantized signals, said switching control signal and said moving vector signal by subjecting a sequence of codes, transmitted from said code transform means, to code inverse transform. Second adding means adds a third predicted signal to said first quantized signal which has been reproduced. Third switching means selectively connects said second quantized signal if said switching control signal which has been reproduced gives an instruction to refresh, or the addition signal of said adding means if the instruction is not to refresh. The second frame memory delays the signal selectively connected by said third switching means by a predetermined number of frames. A third orthogonal inverse transform circuit returns the output signal of said frame memory by subjecting it to orthogonal transform. A variable delay circuit gives a delay corresponding to said moving vector signal which has been reproduced to the signal returned to the space region by said orthogonal inverse transform circuit. A second orthogonal transform circuit generates said third predicted signal by subjecting the signal delayed by said variable delay circuit to orthogonal transform. A third orthogonal inverse transform circuit reproduces said time-varying image signal by subjecting the signal selectively connected by said third switching means to inverse transform to said orthogonal transform.

In a third time-varying image signal coding apparatus according to the invention, subtracting means subtracts a first predicted signal from an inputted time-varying image signal to supply a prediction error signal. Orthogonal transform means orthogonally transforms said prediction error signal on a block-by-block basis, each block consisting of a plurality of pixels. First quantizing means quantizes the result of said orthogonal transform to supply a first quantized signal. First adding means adds said first quantized signal and a second predicted signal to supply a local decoded signal. Second quantizing means quantizes said local decoded signal to supply a second quantized signal. First switching means selectively connects either said local decoded signal or said second quantized signal. A first frame memory delays the signal selectively connected by said first switching means by a predetermined number of frames to supply the delayed signal as a second predicted signal. First orthogonal inverse transform means subjects said second predicted signal to inverse transform to said orthogonal transform to supply the resultant signal as said first predicted signal. Second switching means selectively connects either said first or second quantized signal. Switching control means provides a switching control signal which gives an instruction to said first and second switching means to selectively connect said second quantizing means when a second frame memory built into a time-varying image signal decoding apparatus is to be refreshed, or to said first switching means and said second switching means to selectively connect said local decoded signal and the quantized signal from said first quantizing means, respectively, if said second frame memory is not to be refreshed. Code transform means subjects either the first or second quantized signal, selectively connected by said second switching means, and said switching control signal, and transmits the transformed signals.

In a third time-varying image signal decoding apparatus according to the invention, code inverse transform means separates and reproduces said quantized signals and said switching control signal by subjecting a sequence of codes, transmitted from said code transform means, to code inverse transform. Second adding means adds a third predicted signal to said first quantized signal which has been reproduced. Third switching means selectively connects said second quantized signal if said switching control signal which has been reproduced gives an instruction to refresh, or the addition signal of said adding means if the instruction is not to refresh. The second frame memory delays the signal selectively connected by said third switching means by a predetermined number of frames to supply the delayed signal as said third predicted signal. A second orthogonal inverse transform circuit reproduces said time-varying image signal by subjecting the signal selectively connected by said third switching means to inverse transform to said orthogonal transform.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 6 illustrates the configuration of a second preferred embodiment of the invention, an example in which motion compensation is introduced into interframe differential orthogonal transform coding;

FIG. 7 illustrates the configuration of a third preferred embodiment of the invention; and FIG. 8 is a block diagram illustrating a fourth preferred embodiment of the invention, adopting a demand refresh system using a group-divided block structure as shown in FIG. 3.

DETAILED DESCRIPTION OF THE PREFERRED EMBODIMENTS

Configurations of the Embodiments

Figures 1, 2:
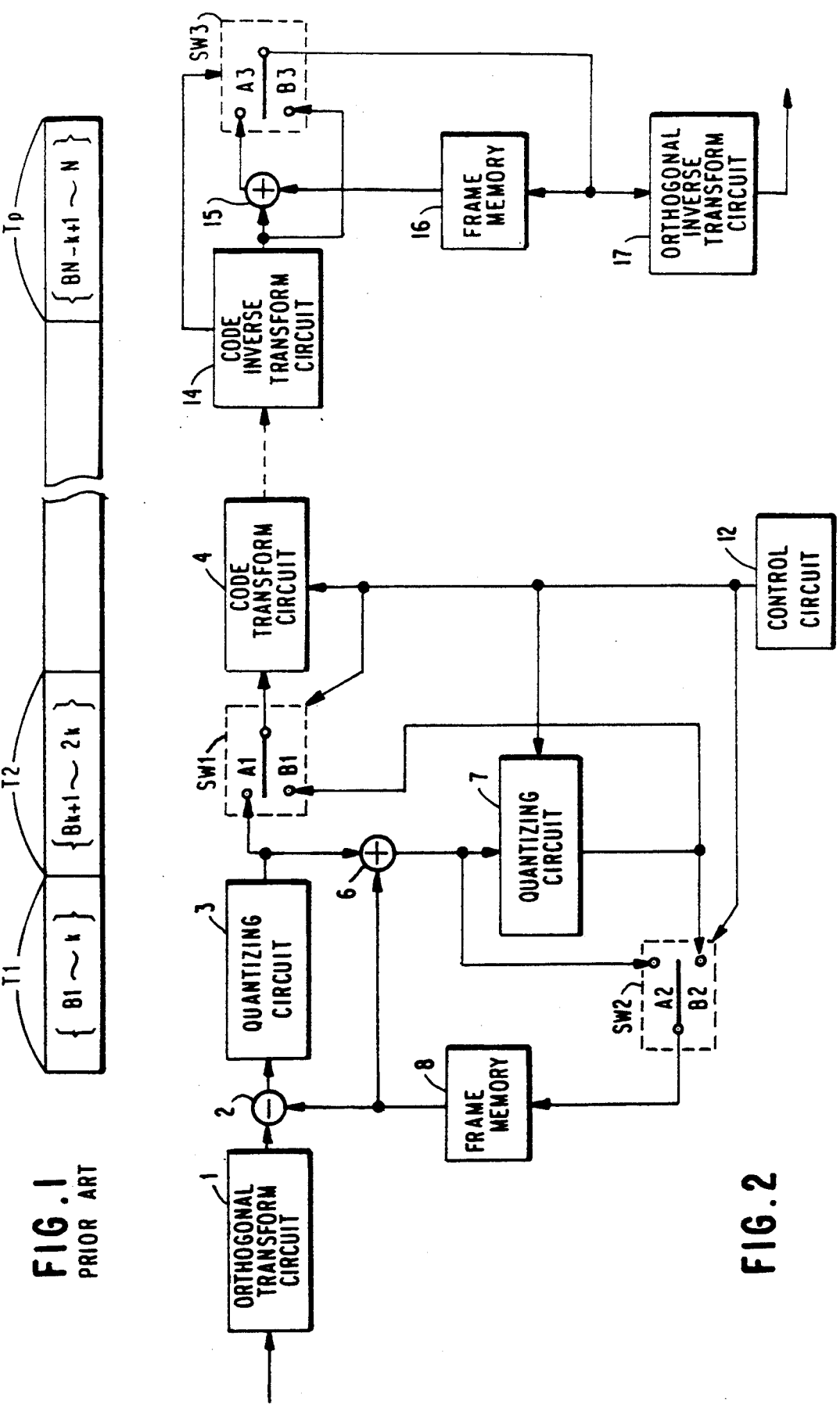
FIG. 1 is a signal timing chart illustrating an example of the aforementioned periodic refreshing in a time-varying image signal coding/decoding system according to the prior art.
FIG. 2 illustrates the configuration of a first preferred embodiment of the invention.

A first preferred embodiment of the present invention consists of a time-varying image signal coding apparatus, a time-varying image signal decoding apparatus and a transmission path connecting these two apparatuses. The time-varying image signal coding apparatus further comprises an orthogonal transform circuit 1 connected to a time-varying image signal input end; a subtractor 2 one of whose input ends is connected to the output end of the orthogonal transform circuit 1; a first quantizing circuit 3 whose input end is connected to the output end of the subtractor 2; a first frame memory 8 whose output end is connected to the other of the input ends of the subtractor 2; an adder 6 of whose two input ends one is connected to the output end of the first quantizing circuit 3 and the other to that of the frame memory 8; a second quantizing circuit 7 whose input end is connected to the output end of the adder 6; a first switch SW2 for selectively connecting either the output end of the adder 6 or that of the second quantizing circuit 7 to the input end of the first frame memory 8; a code transform circuit 4 whose output end is connected to the transmission path; a second switch SW1 for selectively connecting either the output end of the first quantizing circuit 3 or that of the second quantizing circuit 7 to the code transform circuit 4; and a control circuit 12 whose control output end is connected to the first and second switches SW2 and SW1, and the control input ends of the second quantizing circuit 7 and of the code transform circuit 4.

The time-varying image signal decoding apparatus comprises a code inverse transform circuit 14 whose input end is connected to the transmission path; a second frame memory 16; an adder 15 of whose two input ends one is connected to the output end of the frame memory 16 and the other to that of the code inverse transform circuit 14; an orthogonal inverse transform circuit 17 whose output end is connected to a time-varying image signal output end; and a third switch SW3, whose control input end is connected to the control output end of the code inverse transform circuit 14, for selectively connecting either the output end of the adder 15 or that of the code inverse transform circuit 14 to the input end of the second frame memory 16 and that of the orthogonal inverse transform circuit 17.

A second preferred embodiment of the present invention, illustrated in FIG. 6, consists of a time-varying image signal coding apparatus, a time-varying image signal decoding apparatus and a transmission path connecting these two apparatuses. The time-varying image signal coding apparatus further comprises a subtractor 2 one of whose input ends is connected to a time-varying image signal input end; a motion detecting circuit 5 whose input end is connected to the time-varying image signal input end; a first orthogonal transform circuit 1 whose input end is connected to the output end of the subtractor 2; a first quantizing circuit 3 whose input end is connected to the output end of the orthogonal transform circuit 1; a first adder 6 one of whose input ends is connected to the output end of the first quantizing circuit 3; a second quantizing circuit 7 one of whose input end is connected to the output end of the first adder 6; a first frame memory 8; a first switch SW2 for selectively connecting either the output end of the first adder 6 or that of the second quantizing circuit 7 to the input end of the first frame memory 8; a first orthogonal inverse transform circuit 9 whose input end is connected to the output end of the first frame memory 8; a variable delay circuit 10, of whose input ends one is connected to the output end of the orthogonal inverse transform circuit 9 and the other to that of the motion detecting circuit 5 and whose output end is connected to the other input end of the subtractor 2; a second orthogonal transform circuit 11 whose input and output ends are connected to the output end of the variable delay circuit 10 and to the other input end of the first adder 6, respectively; a code transform circuit 4A whose first input end and output end are connected to the output end of the motion detecting circuit 5 and to the transmission path, respectively; a second switch SW1 for selectively connecting either the output end of the first quantizing circuit 3 or that of the second quantizing circuit 7 to a second input end of the code transform circuit 4A; and a control circuit 12 whose output end is connected to the second switch SW1, and the control input ends of the code transform circuit 4A and of the second quantizing circuit 7.

The time-varying image signal decoding apparatus comprises a code inverse transform circuit 14A whose input end is connected to the transmission pzth; a variable delay circuit 18, one of whose input ends is connected to a first output end of the orthogonal inverse transform circuit 14A; a third orthogonal transform circuit 19 whose input end is connected to the output end of the variable delay circuit 18; a second adder 15 of whose input ends one is connected to the output end of the code inverse transform circuit 14A and the other to that of the third orthogonal transform circuit 19; a second frame memory 16; a second orthogonal inverse transform circuit 17 whose input and output ends are connected to the output end of the frame memory 16 and the other input end of the variable delay circuit 18, respectively; a third orthogonal inverse transform circuit 20 whose output end is connected to a time-varying image signal output end; and a third switch SW3, whose control input end is connected to the control output end of the code inverse transform circuit 14A, for selectively connecting either the output end of the adder 15 or that of the code inverse transform circuit 14A to the input ends of the second frame memory 16 and of the third orthogonal inverse transform circuit 20.

As illustrated in FIG. 7, a third preferred embodiment of the present invention consists of a time-varying image signal coding apparatus, a time-varying image signal decoding apparatus and a transmission path connecting these two apparatuses. The time-varying image signal coding apparatus further comprises a subtractor 2 one of whose input ends is connected to a time-varying image signal input end; an orthogonal transform circuit 1 whose input end is connected to the output end of the subtractor 2; a first quantizing circuit 3 whose input end is connected to the output end of the orthogonal transform circuit 1; a first frame memory 8; a first adder 6 of whose input ends one is connected to the output end of the output end of the first frame memory 8 and the other is connected to the output end of the first quantizing circuit 3; a second quantizing circuit 7 one of whose input end is connected to the output end of the first adder 6; a first switch SW2 for selectively connecting either the output end of the second quantizing circuit 7 or that of the first adder 6 to the input end of the first frame memory 8; a code transform circuit 4 whose output end is connected to the transmission path; a second switch SW1 for selectively connecting either the output end of the first quantizing circuit 3 or that of the second quantizing circuit 7 to the input end of the code transform circuit 4A; and a control circuit 12 whose output end is connected to the first and second switches SW2 and SW1, and the control input ends of the second quantizing circuit 7 and of the code transform circuit 4.

The time-varying image signal decoding apparatus comprises a code inverse transform circuit 14 whose input end is connected to the transmission path; a second adder 15 one of whose input ends is connected to the output end of the code inverse transform circuit 14; a second frame memory 16; a second orthogonal inverse transform circuit 20 whose output end is connected to the time-varying image input end; and a third switch SW3, whose control input end is connected to the control output end of the code inverse transform circuit 14, for selectively connecting either the output end of the code inverse transform circuit 14 of that of the second adder 15 to the input ends of the second frame memory 16 and of the second orthogonal inverse transform citcuit 20.

A fourth preferred embodiment of the present invention is illustrated in FIG. 8 and consists of a first station 100, a second station 200, a first transmission path connecting the first station and the second station, and a second transmission path connecting the second station and the first station. The first station 100 further comprises a first coding circuit 101 whose input end is connected to a first time-varying image signal input end; a second code transform circuit 102 whose input and output ends are connected to the output end of the first coding circuit 101 and the first transmission path, respectively; a first switching control circuit 103 whose output end is connected to the control input ends of the first coding circuit 101 and of the first code transform circuit 102; a first code inverse transform circuit 104 whose input and first output ends are connected to the second transmission path and the input end of the first switching control circuit 103, respectively; and a first decoding circuit 105 of whose two input ends one is connected to the second, and the other to the third, output ends of the first code inverse transform circuit 104 and whose output end is connected to a first time-varying image signal output end.

The second station 200 further comprises a first coding circuit 201 whose input end is connected to a second time-varying image signal input end; a second code transform circuit 202 whose input and output ends are connected to the output end of the second coding circuit 201 and the second transmission path, respectively; a second switching control circuit 203 whose output end is connected to the control input ends of the second coding circuit 201 and of the second code transform circuit 202; a second code inverse transform circuit 204 whose input and first output ends are connected to the first transmission path and the input end of the second switching control circuit 203, respectively; and a second decoding circuit 205 whose two input ends are connected to the two output ends of the second code inverse transform circuit 204 and whose output end is connected to a second time-varying image signal output end.

FIG. 1 is a signal timing chart illustrating an example of the aforementioned periodic refreshing in a time-varying image signal coding/decoding system according to the prior art. The frame is divided into two-dimensional blocks, each consisting of a plurality of lines and a plurality of pixels, and block numbers from the first block $B_1$ to the Nth block $B_N$ are assigned along the lines. FIG. 1 shows a case in which K blocks' equivalent is refreshed per frame from the first frame period $T_1$ till the pth frame $T_p$ (N=P·K). In the first frame period $T_1$ for instance, blocks from the first $B_1$ to the Kth $B_K$ are refreshed, and this refreshing is represented by an abbreviation of $\{B_{1 \sim K}\}$. In each frame period, signals resulting from the interframe coding of time-varying image signals are transmitted except during the transmission of refreshed signals.

Next will be described preferred embodiments of the present invention with reference to drawings.

FIG. 2 illustrates the configuration of a first preferred embodiment of the invention. The time-varying image signal coding apparatus comprises an orthogonal transform circuit 1; a subtractor 2; a quantizing circuit 3; a frame memory 8; another quantizing circuit 7, a switch SW1; and another switch SW2. The time-varying image signal decoding apparatus comprises a code inverse transform circuit 14; an adder 15; a frame memory 16; an orthogonal inverse transform circuit 17; and a switch SW3.

The operation of the time-varying image signal coding apparatus will be described below.

The orthogonal transform circuit 1 supplies the subtractor 2 with a signal obtained by orthogonally transforming an inputted time-varying image signal on a block-by-block basis, each block consisting of a plurality of pixels (to be described in further detail below). The subtractor 2 subtracts from the signal supplied by the orthogonal transform circuit 1 its predicted signal given by the frame memory 8 to generate a prediction error signal in the transform region, and supplies it to the quantizing circuit 3. The quantizing circuit 3 supplies a quantized signal obtained by quantizing the prediction error signal to the terminal A1 of the switch SW1 and the adder 6. The adder 6 generates a local decoded signal by adding the predicted signal from the frame memory 8 and the quantized signal from the quantizing circuit 3, and supplies it the terminal A2 of the switch SW2 and the quantizing circuit 7. The quantizing circuit 7 supplies a quantized signal obtained by quantizing the local decoded signal to the terminal B1 of the switch SW1 and the terminal B2 of the switch SW2. The frame memory 8 delays the signal, selectively connected by the switch SW2, by writing it in, temporarily storing it and reading it out after the lapse of a one-frame time, and thereby generates said predicted signal.

The code transform circuit 4 subjects the quantized signal, selectively connected by the switch SW1, to variable-length coding, and codes a switching control signal provided from the switching control circuit 12, and transmits the coded signals to the time-varying image signal decoding apparatus via the transmission path. The switching control circuit 12 generates said switching control signal which gives an instruction to the switches SW1 and SW2 as to which of the two terminals on the input side is to be selected for connection to the terminal on the output side. For the selective connection of the terminals A1 and A2, the signal resulting from the quantizing of the prediction error signal, supplied from the quantizing circuit 3, is transmitted from the code transform circuit 4 as the sequence of codes or, for the selection of the terminals B1 and B2, the quantized signal supplied from the quantizing circuit 7 is transmitted from the code transform circuit 4 as the sequence of refreshing codes.

Next will be described the operation of the time-varying image signal decoding apparatus.

The code inverse transform circuit 14 decodes and separates the sequence of codes received from the transmission path, and supplies a prediction error signal or a local decoded signal to the adder 15 and to the terminal B3 of the switch SW3 and a switching control signal to the switch SW3. The switch SW3, like the switches SW1 and SW2 on the transmitting side, selectively connects either the terminal A3 or the terminal B3 as instructed by the switching control signal. When the terminal A3 is selectively connected, the prediction error signal supplied from the code inverse transform circuit 14, after being added to the predicted signal by the adder 15, is returned to the space region to reproduce said time-varying image signal. The result of addition by the adder 15 is delayed by being temporarily stored in the frame memory 16 and read out after the lapse of a one-frame time, and sent to the adder 15 as a reproduced predicted signal. On the other hand, when the terminal B3 is selectively connected, the local decoded signal for the refreshing purpose, supplied from the code inverse transform circuit 14, is written into the frame memory 16 to perform refreshing.

Figure 3B:
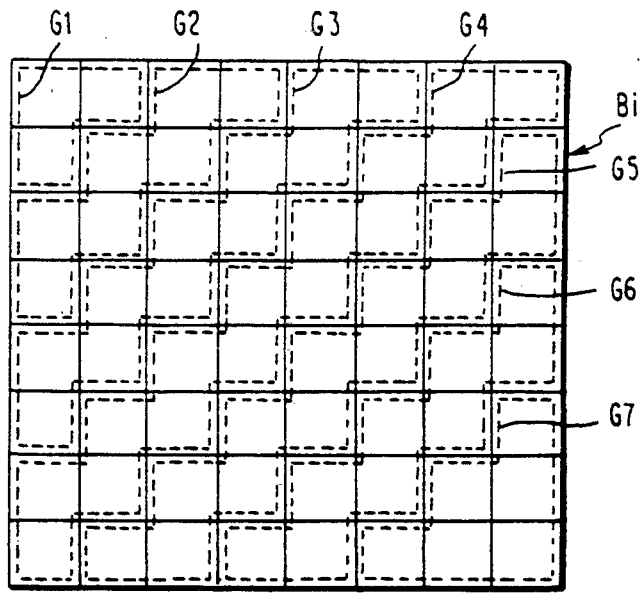
FIG. 3 is a structural diagram illustrating an example of the block formation of transform coefficients in the first preferred embodiment.
Figure 3A:
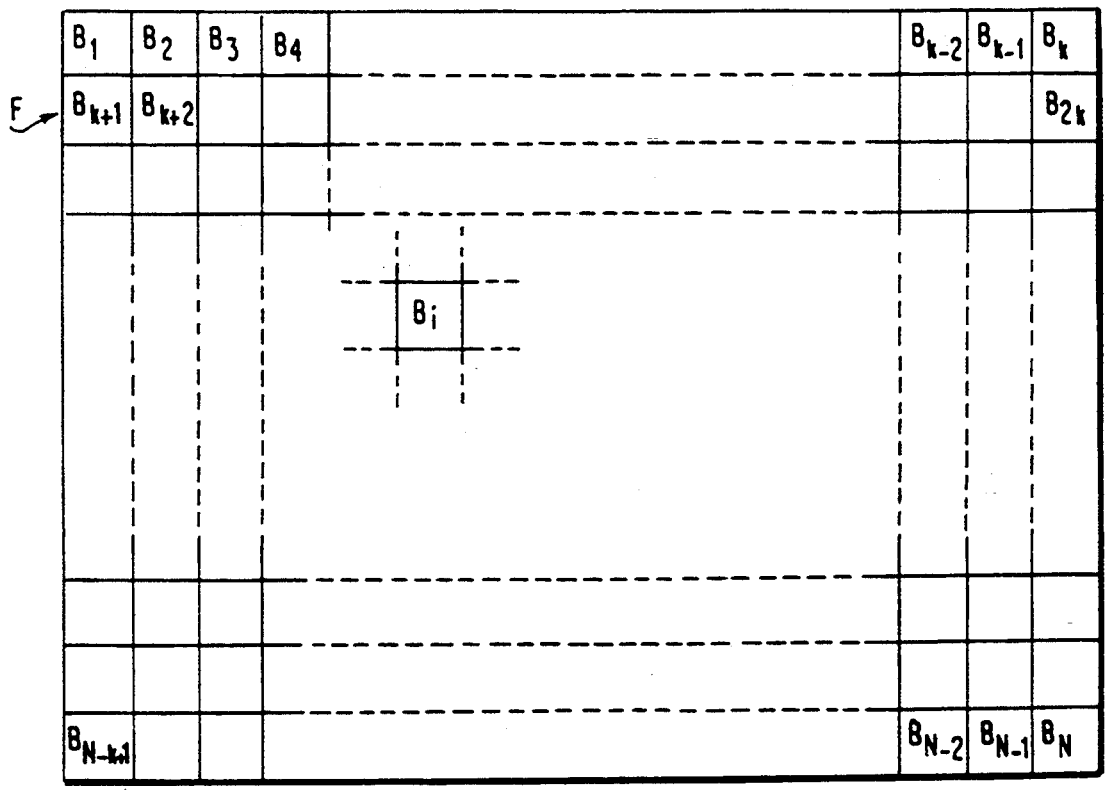
Figure 4:
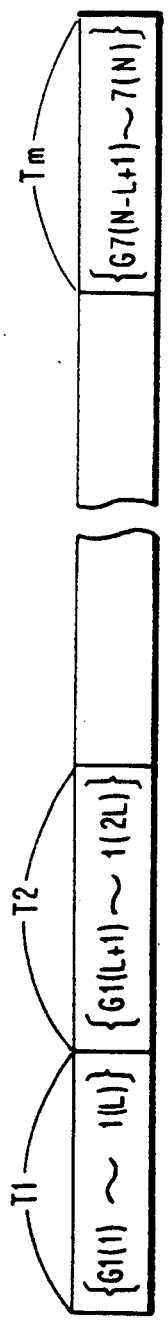
FIG. 4 is a signal timing chart for describing the periodic refreshing in the first embodiment.

FIG. 3 is a structural diagram illustrating an example of the block formation of transform coefficients in the first preferred embodiment, and FIG. 4 is a signal timing chart for describing the periodic refreshing in the first embodiment.

Referring to FIG. 3, a frame F is divided into two-dimensional blocks, each consisting of eight lines by eight pixels, and block numbers from the first block $B_1$ to the Nth block $N_N$ are sequentially assigned in the direction of the lines. Each block (for instance the ith block $B_i$) is a two-dimensional block of eight lines by eight pixels, and further divided into seven groups, the first G1 to the seventh G7, from the upper left corner, the lowest in sequence, toward the lower right corner, the highest in sequence. Refreshing is carried out, as typically illustrated in FIG. 4, upon L groups of each block per frame period between the first frame period $T_1$ till the mth frame period $T_m$ (N=Lm). In the first frame $T_1$, for instance, the first group G1 from the first block $B_1$ through the Lth block $B_L$ are refreshed. This is represented by an abbreviation of $\{G_{1(1)\sim 1(L)}\}$. In each frame period, signals resulting from the coding of prediction error signals are transmitted except during the transmission of refreshed signals.

Figure 5:
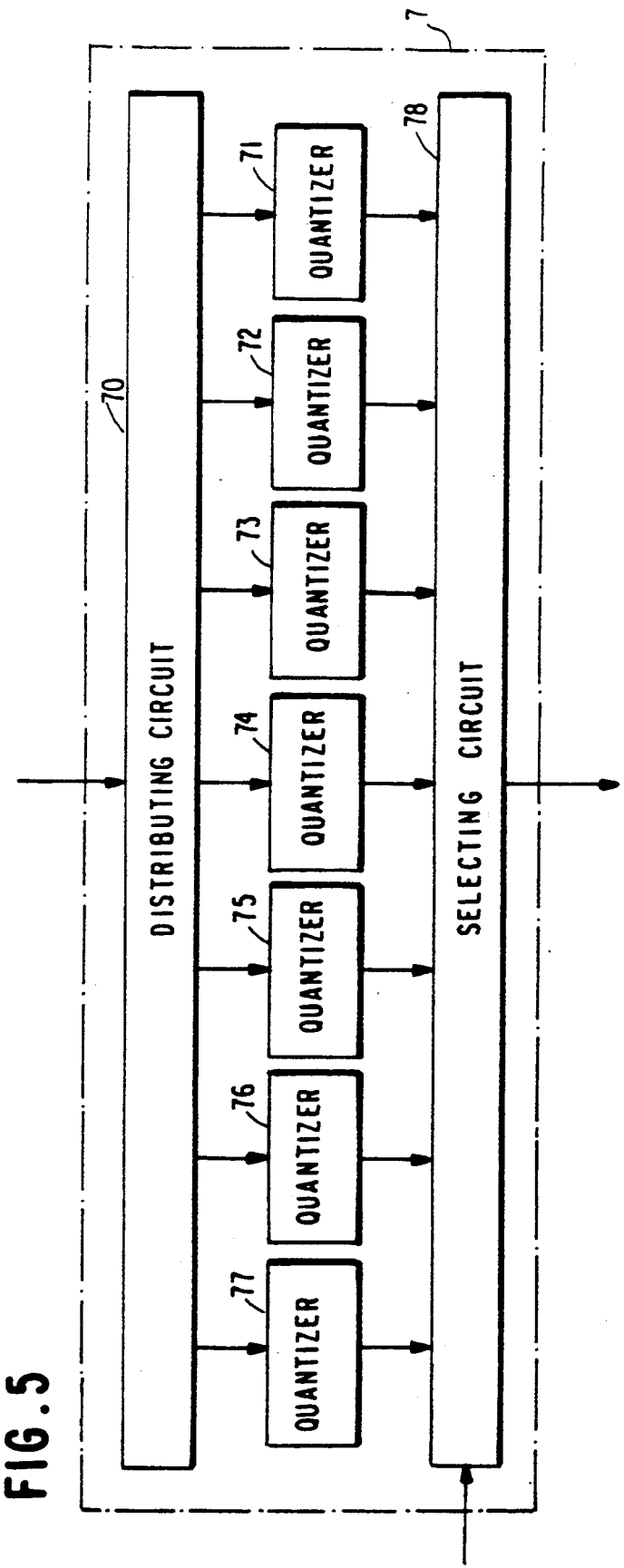
FIG. 5 is a block diagram illustrating an example of the configuration of the quantizing circuit 7 in the first embodiment.

FIG. 5 is a block diagram illustrating an example of the configuration of the quantizing circuit 7 in the first preferred embodiment. The quantizing circuit 7 is provided to quantize the local decoded signal to match it with an input value acceptable by the code transform circuit 4 when refreshed signals are to be transmitted. The local decoded signal provided by the adder 6 is distributed by a distributing circuit 70 among quantizers 71 through 77 for the first group $G_1$ through the seventh group $G_7$, respectively. Since picture quality deterioration is usually greater in the lower part of the sequence, the quantizing steps are the finest in the quantizer 71, and become coarser in the order of the quantizers 72, 73, 74, 75, 76 and 77. A selecting circuit 78, receiving the switching control signal from the switching control circuit 12 for indicating the reference number of the group to be refreshed, selects the quantizing output for the group, and supplies it to the terminal B1 of the switch SW1 and the terminal B2 of the switch SW2.

In the first preferred embodiment so far described:
(1) No difference occurs in received picture quality between the refreshed part and the remaining part because the local decoded signals are transmitted as refreshed signals.
(2) Since the blocks of transform coefficients are further divided into pluralities of groups for the transmission of refreshed signals, the time taken to refresh a whole frame is longer than according to the prior art, and accordingly the quantity of refreshing information per unit time is reduced, resulting in an improved coding efficiency. Whereas the first embodiment is a case in which all the groups are refreshed at an equal frequency, the coding efficiency can be further improved by refreshing less frequently the groups higher in the sequence, which affect the picture quality less, lower than those lower in sequence.

FIG. 6 illustrates the configuration of a second preferred embodiment of the invention, an example in which motion compensation is introduced into interframe differential orthogonal transform coding.

A time-varying image signal coding apparatus is provided with an orthogonal transform circuit 1, a subtractor 2, a quantizing circuit 3, a code transform circuit 4A, a motion detecting circuit 5, an adder 6, another quantizing circuit 7, a frame memory 8, an orthogonal inverse transform circuit 9, a variable delay circuit 10, another orthogonal transform circuit 11, and a switching control circuit 12. A time-varying image signal decoding apparatus comprises a code inverse transform circuit 14A, an adder 15; a switch SW3, a frame memory 16, an orthogonal inverse transform circuit 17, a variable delay circuit 18, an orthogonal transform circuit 19, and another orthogonal inverse transform circuit 20.

The operation of the time-varying image signal coding apparatus will be described below.

The motion detecting circuit 5, into which a time-varying image signal has been entered, detects a moving vector signal by interframe block matching. The moving vector signal is supplied to the code transform circuit 4A and the variable delay circuit 10. Meanwhile, the subtractor 2 supplies the orthogonal transform circuit 1 with a prediction error signal obtained by subtracting from the time-varying image signal, provided to one of the input ends, a predicted signal supplied to the other input end from the variable delay circuit 10. The orthogonal transform circuit 1 applies orthogonal transform to the prediction error signal for each block consisting of a plurality of pixels, and supplies the resultant signal to the quantizing circuit 3. The quantizing circuit quantizes the transform coefficient obtained by orthogonal transform, and supplies the quantized signal to the terminal A1 of the switch SW1 and the adder 6.

The adder 6 generates a local decoded signal by adding the signal orthogonally transformed by the orthogonal transform circuit 11 and the quantized signal supplied from the quantizing circuit 3, and supplies this local decoded signal to the terminal A2 of the switch SW2 and the quantizing circuit 7. The quantizing circuit 7 quantizes the local decoded signal, and supplies the quantized signal to the terminal B1 of the switch SW1 and the terminal B2 of the switch SW2. The frame memory 8 delays the signal, selectively connected by the switch SW2, by writing it in, temporarily storing it and reading it out after the lapse of a one-frame time, and supplies the resultant predicted signal to the orthogonal inverse transform circuit 9, which returns this predicted signal from the transform region to the space region. The variable delay circuit 10 supplies the predicted signal, obtained by giving the output signal of the orthogonal inverse transform circuit 9 a delay corresponding to the moving vector, to the subtractor 2 and the orthogonal transform circuit 11, which applies orthogonal transform to the predicted signal and supplies the resultant signal to the adder 6.

The code transform circuit 4A applies variable-length coding to the quantized signal selectively connected by the switch SW1, at the same time encodes the moving vector signal provided from the motion detecting circuit 5 and a switching control signal provided from the switching control circuit 12, and transmits the coded signals to the time-varying image signal decoding apparatus via the transmission path. The switching control circuit 12 supplies the switching control signal, which gives an instruction as to which of the terminals A1, A2 and B1, B2 of the switches SW1 and SW2 are to be selected for connection. When the terminals A1 and A2 are selectively connected, the signal supplied from the quantizing circuit 3, resulting from the quantizing of the prediction error transform coefficient, is subjected to coded transmission from the code transform circuit 4A, and the local decoded signal is not quantized but supplied as it is to the frame memory 8. On the other hand, when the terminals B1 and B2 are selectively connected, the signal supplied from the quantizing circuit 7, resulting from the quantizing of the local decoded signal, is subjected to coded transmission from the code transform circuit 4A for the refreshing purpose, and also supplied to the frame memory 8.

Next will be described the operation of the time-varying image signal decoding apparatus.

The sequence of codes received from the transmission path is decoded and separated by the code inverse transform circuit 14A; either the prediction error transform coefficient or the local error signal is supplied to the adder 15 and the terminal B3 of the switch SW3, the switching control signal is to the switch SW3, and the moving vector signal is to the variable delay circuit 18, The switch SW3, like the switches SW1 and SW2 of the time-varying image coding apparatus, selectively connects either the terminal A3 or the terminal B3 as instructed by the switching control signal. When the terminal A3 is selectively connected, the prediction error transform coefficient is supplied from the code inverse transform circuit 14A, and a predicted coded signal, obtained as the result of the addition of a predicted transform coefficient to the prediction error transform coefficient by the adder 15, is returned to the space region to be reproduced as the time-varying image signal. The result of addition by the adder 15 is delayed by being temporarily stored in the frame memory 16 and read out after the lapse of a one-frame time, returned to the space region by the orthogonal inverse transform circuit 17, given a delay corresponding to the moving vector by the variable delay circuit 18, further turned into the predicted transform coefficient by the orthogonal transform circuit 19, and fed back to the adder 15. On the other hand, when the terminal B3 is selectively connected, the local decoded signal for the refreshing purpose is supplied from the code inverse transform circuit 14A, and written directly into the frame memory 16 to perform refreshing.

The block formation of the transform coefficient and the periodic refreshing operation in the second preferred embodiment are the same as in the first embodiment described with reference to FIGS. 3 and 4.

FIG. 7 illustrates the configuration of a third preferred embodiment of the invention.

This third embodiment is structured by removing from the second embodiment the functions related to motion compensation, and this configuration also provides the same effect as the second embodiment.

FIG. 8 is a block diagram illustrating a fourth preferred embodiment of the invention, adopting a demand refresh system using a group-divided block structure as shown in FIG. 3. In this embodiment, a sequence of codes is transmitted and received between a station 100 and another station 200. In the time-varying image signal coding apparatus of the station 100, a time-varying image signal is subjected to orthogonal transform and interframe coding by a coding circuit 101, and a code transform circuit 102 applies variable-length coding to a quantized signal supplied from the coding circuit 101 to turn it into a sequence of codes, which is transmitted to the code inverse transform circuit 204 of the time-varying image signal decoding apparatus of the station 200. The code inverse transform circuit 204 decodes the sequence of codes to reproduce the signal having undergone orthogonal transform and interframe coding, and a decoding circuit 205, into which this signal is entered, reproeuces the time-varying image signal.

Unless a transmission path error arises while this sequence of codes is being transferred, no refreshing takes place. If a transmission path error occurs durding a transfer, for instance, from the station 100 to the station 200, the code inverse transform circuit 204 will become unable to perform correct decoding, and trouble information indicating the inability is conveyed from the code inverse transform circuit 204 to a switching control circuit 203. In accordance with this trouble information, the switching control circuit 203 supplies a code transform circuit 202 with a refresh transmit demand signal for the station 100, and the code transform circuit 202 transmits this demand signal to the station 100. A code inverse transform circuit 104, having received this refresh transmit demand signal, transfers this signal to a switching control circuit 103. In accordance with this, the switching control circuit 103 supplies a refresh control signal for having the local decoded signal of the coding circuit 101 supplied to the code transform circuit 102 as a refreshing signal. The code transform circuit 102 subjects the local decoded signal for the refreshing purpose to variable-length coding and transmits it, together with a signal supplied from the switching control circuit 103, resulting from the encoding of the refresh control signal, to the station 200. The code inverse transform circuit 204, having received the refresh control signal, so controls the decoding circuit 205 as to have the refreshing signal, which follows the refresh control signal, written into the frame memory of the decoding circuit 205.

Whereas this round of demand refresh operations refreshes the frame memory of the decoding circuit 205 only when the code inverse transform circuit 204 has failed to perform correct decoding, each block of the frame F is further divided into groups G1 through G7 as illustrated in FIG. 3; the reference numbers of the group including the transfer coefficient having become unable to be decoded and of its block are indicated, together with the trouble information, from the code inverse transform circuit 204 to the switching control circuit 103 via the switching control circuit 203, the code transform circuit 202 and the code inverse transform circuit 104; and a refreshing signal only for the block and the part of the group referred to by this indication is transferred. Therefore, the time required for refresh transfer is very short. Furthermore, when the code inverse transform circuit 204 has failed to perform correct decoding, the deterioration of the reproduced picture quality can be better restrained by fixing the output value of the code inverse transform circuit 204 pertaining to the group of the block concerned or the transform coefficient of the group of the block concerned decoded by the decoding circuit 205 at a predetermined value (0 for instance) than by decoding by the decoding circuit 205 using a wrong prediction error signal.

The coding circuits 101 and 201 are each composed, as illustrated in FIG. 2, of an orthogonal transform circuit 1, a subtractor 2, a quantizing circuit 3, a code transform circuit 4, another quantizing circuit 7, a frame memory 8, a switch SW1 and another switch SW2. The code transfer circuits 102 and 202 have the same constitutions as that of the code transform circuit 4 shown in FIG. 2, and the switching control circuit 103 and 203 have the same constitutions as that of the switching control circuit 12 shown in FIG. 2. The decoding circuits 105 and 205 are each composed, as illustrated in FIG. 2, of an adder 15, a frame memory 16, an orthogonal inverse transform circuit 17 and a switch SW3. The code inverse transform circuits 104 and 204 have the same constitutions as that of the code inverse transform circuit 14 shown in FIG. 2.

On the other hand, where motion compensation is to be combined with the interframe differential orthogonal transform coding method, coding circuits 101 and 201 are each composed, as illustrated in FIG. 6, of an orthogonal transform circuit 1, a subtractor 2, a quantizing circuit 3, a code transform circuit 4, a motion compensating circuit 5, an adder 6, another quantizing circuit 7, a frame memory 8 an orthogonal inverse transform circuit 9, a variable delay circuit 10, still another quantizing circuit 11, a switch SW1 and another switch SW2, and the decoding circuits 105 and 205 are each composed, as illustrated in FIG. 6, of an adder 15, a frame memory 16, an orthogonal inverse transform circuit 17, a variable delay circuit 18, an orthogonal transform circuit 19 and a switch SW3.

As hitherto described, according to the present invention, an equal refreshing effect to what is given by the prior art can be achieved with less refresh information than by the prior art because the local decoded signal in the transform region is refresh-transferred on a component-by-component basis and the minimum required refreshing frequency is ensured for those components whose picture quality deterioration tends to be particularly conspicuous.

Furthermore, where the demand refresh method is used, only the components of the group in which an error has arisen in the erroneous block need to be sent as refresh information, resulting in a significant improvement in the overall coding efficiency.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A time-varying image singal coding/decoding system comprising:

(a) a time-varying image signal coding apparatus comprising:

subtracting means for subtracting a first predicted signal from an inputted time-varying image signal to supply a prediction error signal;

a motion detecting circuit for detecting a moving vector signal by subjecting said time-varying image signal to interframe block matching;

first orthogonal transform means for subjecting said prediction error signal to orthogonal transform on a block-by-block basis, each block comprising a plurality of pixels;

first quantizing means for supplying a first quantized signal by quantizing the result of said orthogonal transform;

first adding means for adding said first quantized signal and orthogonally transformed signal to supply a local decoded signal;

second quantizing means for supplying a second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as a second predicted signal;

a first orthogonal inverse transform circuit for returning said second predicted signal from the transform region to the space region;

a variable delay circuit to generate said first predicted signal by giving a delay, corresponding to said moving vector signal, to the signal returned to the space region by said first orthogonal inverse transform circuit;

a second orthogonal transform circuit for generating said orthogonally transformed signal by subjecting said first predicted signal to orthogonal transform;

second switching means for selectively connecting either said first or second quantized signal;

switching control means for giving a switching control signal to instruct said first and second switching means to selectively connect said second quantizing means when a second frame memory built into a time-varying image signal decoding apparatus is to be refreshed or to instruct said first and second switching means to selectively connect said local decode signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and code transform means for applying variable-length coding to the quantized signal selected by said second switching means, encoding said moving vector signal and said switching control signal, and transmitting the resultant coded signals;

said time-varying image signal decoding apparatus comprising:

code inverse transform means for separating and reproducing a quantized signal, a switching control signal and a moving vector signal by subjecting a sequence of codes transmitted from the code transform means of a time-varying image signal coding apparatus to code inverse transform;

second adding means for adding a third predicted signal to the first quantized signal which has been reproduced to produce an additional signal;

third switching means for selectively connecting a second quantized signal when said reproduced switching control signal instructs refreshing or the addition signal from said adding means if non-refreshing is instructed;

a second frame memory for delaying the signal selectively connected by said third switching means by a predetermined number of frames;

a second orthogonal inverse transform circuit for subjection the output signal of said second frame memory to orthogonal transform and returning the transformed signal to the space region;

a variable delay circuit to generate a first predicted signal by giving a delay, corresponding to said moving vector signal, to the signal returned to the space region by said second orthogonal inverse transform circuit;

a third orthogonal transform circuit for generating said third predicted signal by subjecting the signal delayed by said variable delay circuit; and a third orthogonal inverse transform circuit for reproducing said time-varying image signal by subjecting the signal selectively connected by said third switching means to inverse transform said orthogonal transform, wherein said time-varying image signal coding apparatus comprising:

subtracting means for subtracting a first predicted signal from an inputted time-varying image signal to supply a prediction error signal;

a motion detecting circuit for detecting said moving vector signal by subjecting said time-varying image signal to interframe block matching;

first orthogonal transform means for subjecting said prediction error signal to orthogonal transform on a block-by-block basis, each block comprising a plurality of pixels;

first quantizing means for supplying said first quantized signal by quantizing the result of said orthogonal transform;

first adding means for adding said first quantized signal and orthogonally transformed signal to supply a local decoded signal;

second quantizing means for supplying said second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as a second predicted signal;

a first orthogonal inverse transform circuit for returning said second predicted signal from the transform region to the space region;

a variable delay circuit to generate said first predicted signal by giving a delay, corresponding to said moving vector signal, to the signal returned to the space region by said first orthogonal inverse transform circuit;

a second orthogonal transform circuit for generating said orthogonally transformed signal by subjecting said first predicted signal to orthogonal transform;

second switching means for selectively connecting either said first or second quantized signal;

switching control means for giving said switching control signal to instruct said first and second switching means to selectively connect said second quantizing means when said second frame memory built into the time-varying image signal decoding apparatus is to be refreshed or to instruct said first and second switching means to selectively connect said local decoded signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and code transform means for applying variable-length coding to the quantized signal selected by said second switching means, encoding said moving vector signal and said switching control signal, and transmitting the resultant coded signals.

2. A time-varying image signal coding/decoding system, as claimed in claim 1, wherein each of said blocks comprises said groups into which the block is divided according to the relative position in the sequence.

3. A time-varying image signal coding/decoding system, as claimed in claim 2, wherein a relatively high refreshing frequency is set for those of said groups positioned lower in the sequence.

4. A time-varying image signal coding/decoding system, as claimed in claim 1, wherein the refreshing frequency is set for each of said groups.

5. A time-varying image signal coding/decoding system consisting of the time-varying image signal coding apparatus comprising:

subtracting means for subtracting a first predicted signal from an inputted time-varying image signal to supply a prediction error signal;

first orthogonal transform means for subjecting said prediction error signal to orthogonal transform on a block-by-block basis, each block comprising a plurality of pixels;

first quantizing means for supplying a first quantized signal by quantizing the result of said orthogonal transform;

first adding means for adding said first quantized signal and second predicted signal to supply a local decoded signal;

second quantizing means for supplying a second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as said second predicted signal;

first orthogonal inverse transform means for subjecting said second predicted signal to inverse transform to said orthogonal transform, and supplying the resultant signal as said first predicted signal;

second switching means for selectively connecting either said first or second quantized signal;

switching control means for giving a switching control signal to instruct said first and second switching means to selectively connect said second quantizing means when a second frame memory built into a time-varying image signal decoding apparatus is to be refreshed or to instruct said first and second switching means to selectively connect said local decoded signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and code transform means for applying code transform to the first or second quantized signal, whichever is selected by second switching means, and said switching control signal, and transmitting the resultant code-transformed signals, and (b) a time-varying image signal decoding apparatus comprising:

code inverse transform means for separating and reproducing a quantized signal and a switching control signal by subjecting a sequence of codes transmitted from the code transform means of a time-varying image signal coding apparatus to code inverse transform;

second adding means for adding a third predicted signal to a first quantized signal which has been reproduced;

third switching means for selectively connecting a control signal instructs refreshing or the addition signal from said adding means if non-refreshing is instructed;

a second frame memory for delaying the signal selectively connected by said third switching means by a predetermined number of frames, and supplying the delayed signal as said third predicted signal; and a second orthogonal inverse transform circuit for reproducing a time-varying image signal by subjecting the signal selectively connected by said third switching means to inverse transform to said orthogonal transform; wherein said time-varying image signal coding apparatus comprising:

subtracting means for subtracting a first predicted signal from an inputted time-varying image signal to supply a prediction error signal;

first orthogonal transform means for subjecting said prediction error signal to orthogonal transform on a block-by-block basis, each block comprising a plurality of pixels;

first quantizing means for supplying said first quantized signal by quantizing the result of said orthogonal transform;

first adding means for adding said first quantized singal and orthogonally transformed signal to supply a local decoded signal;

second quantizing means for supplying said second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as a second predicted signal;

first orthogonal inverse transform means for supplying said first predicted signal by subjecting said second predicted signal to inverse transform to said orthogonal transform;

second switching means for selectively connecting either said first or second quantized signal;

switching control means for giving said switching control signal to instruct said first and second switching means to selectively connect said second quantizing means when said second frame memory built into the time-varying image signal decoding apparatus is to be refreshed or to instruct said first and second switching means to selectively connect said local decoded signal and said first quantized signal from said first quantizing means, respectively, when said second frame memory is not to be refreshed, and instructing selective connection to that when refreshing is to be accomplished, said block be refreshed on a group-by-group basis, each group consisting of a plurality of transform coefficients and approximately differing from others in frequency region; and code transform means for applying code transform to the first or second quantized signal, whichever is selected by said second switching means, and said switching control signal, and transmitting the resultant code-transformed signals.

6. A time-varying image signal coding/decoding system, as claimed in claim 5, wherein each of said blocks comprises said groups into which the block is divided according to the relative position in the sequence.

7. A time-varying image signal coding/decoding system, as claimed in claim 6, wherein a relatively high refreshing frequency is set for those of said groups positioned lower in the sequence.

8. A time-varying image signal coding/decoding system, as claimed in claim 5, wherein the refreshing frequency is set for each of said groups.

9. A time-varying image signal coding apparatus comprising:
- subtracting means for subtracting a first predicted signal from an inputted time-varying image signal to supply a prediction error signal;
- a motion detecting circuit for detecting a moving vector signal by subjecting said time-varying image signal to interframe block matching;
- first orthogonal transform means for subjecting said prediction error signal to orthogonal transform on a block-by-block basis, each block comprising a plurality of pixels;
- first quantizing means for supplying a first quantized signal by quantizing the result of said orthogonal transform;
- first adding means for adding said first quantized signal and an orthogonally transformed signal to supply a local decoded signal;
- second quantizing means for supplying a second quantized signal by quantizing said local decoded signal;
- first switching means for selectively connecting either said local decoded signal or said second quantized signal;
- a first frame memory for delaying the signal selectively connected by said first switching means by a predetermined number of frames to supply the delayed signal as a second predicted signal;
- a first orthogonal inverse transform circuit for returning said second predicted signal from the transform region to the space region;
- a variable delay circuit to generate said first predicted signal by giving a delay, corresponding to said moving vector signal, to the signal returned to the space region by said first orthogonal inverse transform circuit;
- a second orthogonal transform circuit for generating said orthogonally transformed signal by subjecting said first predicted signal to orthogonal transform;
- second switching means for selectively connecting either said first or second quantized signal;
- switching control means for giving a switching control signal to instruct said first and second switching means to selectively connect said second quantizing means when a second frame memory built into a time-varying image signal decoding apparatus is to be refereshed or to instruct said first and second switching means to selectively connect said local decoded signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and
- code transform means for applying variable-length coding to the quantized signal selected by said second switching means, encoding said moving vector signal and said switching control signal, and transmitting the resultant coded signals.

10. A time-varying image signal decoding apparatus comprising:
- code inverse transform means for separating and reproducing at least first a quantized signal, a switching control signal and a moving vector signal by subjecting a sequence of codes transmitted from the code transform means of a time-varying image signal coding apparatus to code inverse transform;
- second adding means for adding a third predicted signal to the first quantized signal which has been reproduced to produce an additional signal;
- third switching means for selectively connecting a second quantized signal when said reproduced switching control signal instructs refreshing or the addition signal from said adding means if non-refreshing is instructed;
- a second frame memory for delaying the signal selectively connected by said third switching means by a predetermined number of frames;
- a second orthogonal inverse transform circuit for subjection the output signal of said second frame memory to orthogonal transform and returning the transformed signal to the space region;
- a variable delay circuit to generate a first predicted signal by giving a delay, corresponding to said moving vector signal, to the signal returned to the space region by said second orthogonal inverse transform circuit;
- a third orthogonal transform circuit for generating said third predicted signal by subjecting the signal delayed by said variable delay circuit; and
- a third orthogonal inverse transform circuit for reproducing said time-varying image signal by subjecting the signal selectively connected by said third switching means to inverse transform said orthogonal transform, wherein said time-varying image signal coding apparatus comprising:
- subtracting means for subtracting a first predicted signal from an inputted time-varying image signal to supply a prediction error signal;
- a motion detecting circuit for detecting said moving vector signal by subjecting said time-varying image signal to interframe block matching;
- first orthogonal transform means for subjecting said prediction error signal to orthogonal transform on a block-by-block basis, each block comprising a plurality of pixels;
- first quantizing means for supplying said first quantized signal by quantizing the result of said orthogonal transform;
- first adding means for adding said first quantized signal and orthogonally transformed signal to supply a local decoded signal;
- second quantizing means for supplying said second quantized signal by quantizing said local decoded signal;
- first switching means for selectively connecting either said local decoded signal or said second quantized signal;
- a first frame memory for delaying the signal selectively connected by said first switching means by a predetermined number of frames to supply the delayed signal as a second predicted signal;
- a first orthogonal inverse transform circuit for returning said second predicted signal from the transform region to the space region;
- a variable delay circuit to generate said first predicted signal by giving a delay, corresponding to said moving vector signal, to the signal returned to the space region by said first orthogonal inverse transform circuit;

a second orthogonal transform circuit for generating said orthogonally transformed signal by subjecting said first predicted signal to orthogonal transform;

second switching means for selectively connecting either said first or second quantized signal;

switching control means for giving said switching control signal to instruct said first and second switching means to selectively connect said second quantizing means when said second frame memory built into the time-varying image signal decoding apparatus is to be refreshed or to instruct said first and second switching means to selectively connect said local decoded signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and code transform means for applying variable-length coding to the quantized signal selected by said second switching means, encoding said moving vector signal and said switching control signal, and transmitting the resultant coded signals.

11. A time-varying image signal coding apparatus comprising:

subtracting means for subtracting a first predicted signal from an inputted time-varying image signal to supply a prediction error signal;

first orthogonal transform means for subjecting said prediction error signal to orthogonal transform on a block-by-block basis, each block comprising a plurality of pixels;

first quantizing means for supplying a first quantized signal by quantizing the result of said orthogonal transform;

first adding means for adding said first quantized signal and second predicted signal to supply a local decoded signal;

second quantizing means for supplying a second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as said second predicted signal;

first orthogonal inverse transform means for subjecting said second predicted signal to inverse transform to said orthogonal transform, and supplying the resultant signal as said first predicted signal;

second switching means for selectively connecting either said first or second quantized signal;

switching control means for giving a switching control signal to instruct said first and second switching means to selectively connect said second quantizing means when a second frame memory built into a time-varying image signal decoding apparatus is to be refreshed or to instruct said first and second switching means to selectively connect said local decoded signal and said first quantized signal from said first quantizing means, respectively, when said second frame memory is not to be refreshed, and instructing selective connection so that, when refreshing is to be accomplished, said block be refreshed on a group-by-group basis, each group consisting of a plurality of transform coefficients and approximately differing from others in frequency region; and code transform means for applying code transform to the first or second quantized signal, whichever is selected by said second switching means, and said switching control signal, and transmitting the resultant code-transformed signals.

12. A time-varying image signal decoding apparatus comprising:

code inverse transform means for separating and reproducing a quantized signal and a switching control signal by subjecting a sequence of codes transmitted from the code transform means of a time-varying image signal coding apparatus to code inverse transform;

second adding means for adding a third predicted signal to a first quantized signal which has been reproduced;

third switching means for selectively connecting a second quantized signal when said reproduced switching control signal instructs refreshing or the addition signal from said adding means if non-refreshing is instructed;

a second frame memory for delaying the signal selectively connected by said third switching means by a predetermined number of frames, and supplying the delayed signal as said third predicted signal; and a second orthogonal inverse transform circuit for reproducing a time-varying image signal by subjecting the signal selectively connected by said third switching means to inverse transform to said orthogonal transform; wherein said time-varying image signal coding apparatus comprising:

subtracting means for subtracting a first predicted signal from an inputted time-varying image signal to supply a prediction error signal;

first orthogonal transform means for subjecting said prediction error signal to orthogonal transform on a block-by-block basis, each block comprising a plurality of pixels;

first quantizing means for supplying said first quantized signal by quantizing the result of said orthogonal transform;

first adding means for adding said first quantized signal and orthogonally transformed signal to supply a local decoded signal;

second quantizing means for supplying said second quantized signal by quantizing said local decoded signal;

first switching means for selectively connecting either said local decoded signal or said second quantized signal;

a first frame memory for delaying the signal selectively connected by said first switching means by a predetermined number of frames to supply the delayed signal as a second predicted signal;

first orthogonal inverse transform means for supplying said first predicted signal by subjecting said second predicted signal to inverse transform to said orthogonal transform; second switching means for selectively connecting either said first or second quantized signal;

switching control means for giving said switching control signal to instruct said first and second switching means to selectively connect said second quantizing means when said second frame memory built into the time-varying image signal cecoding apparatus is to be refreshed or to instruct said first and second switching means to selectively connect said local decoded signal and said first quantized signal from said first quantizing means, respectively, when said second frame memory is not to be refreshed, and instructing selective connection to that, when refreshing is to be accomplished, said block be refreshed on a group-by-group basis, each group consisting of a plurality of transform coefficients and approximately differing from others in frequency region; and code transform means for applying code transform to the first or second quantized signal, whichever is selected by said second switching means, and said switching control signal, and transmitting the resultant code-transformed signals.

* * * * *

UNITED STATES PATENT AND TRADEMARK OFFICE
CERTIFICATE OF CORRECTION

PATENT NO. : 5,424,777
DATED : June 13, 1995
INVENTOR(S) : Toshio Koga

It is certified that error appears in the above-indentified patent and that said Letters Patent is hereby corrected as shown below:

Column 2, line 10 delete "pixesl", insert --pixels--.

Column 6, line 44 delete "pzth", insert --path--.

Column 12, line 48 delete "reproeuces", insert --reproduces--.

Column 12, line 51 delete "durding", insert --during--.

Column 15, line 25 after "reproducing", insert --at least first--.

Column 19, line 51, delete "refereshed", insert --refreshed--.

UNITED STATES PATENT AND TRADEMARK OFFICE
CERTIFICATE OF CORRECTION

PATENT NO. : 5,424,777
DATED : June 13, 1995
INVENTOR(S) : Toshio Koga

It is certified that error appears in the above-indentified patent and that said Letters Patent is hereby corrected as shown below:

Column 14, line 26 delete "singal", insert --signal--.

Column 23, line 9 delete "cecoding", insert --decoding--.

Column 18, line 21 delete "singal", insert --signal--.

Signed and Sealed this

Fifth Day of March, 1996

Attest:

BRUCE LEHMAN

Attesting Officer      Commissioner of Patents and Trademarks